UNITED STATES PATENT OFFICE.

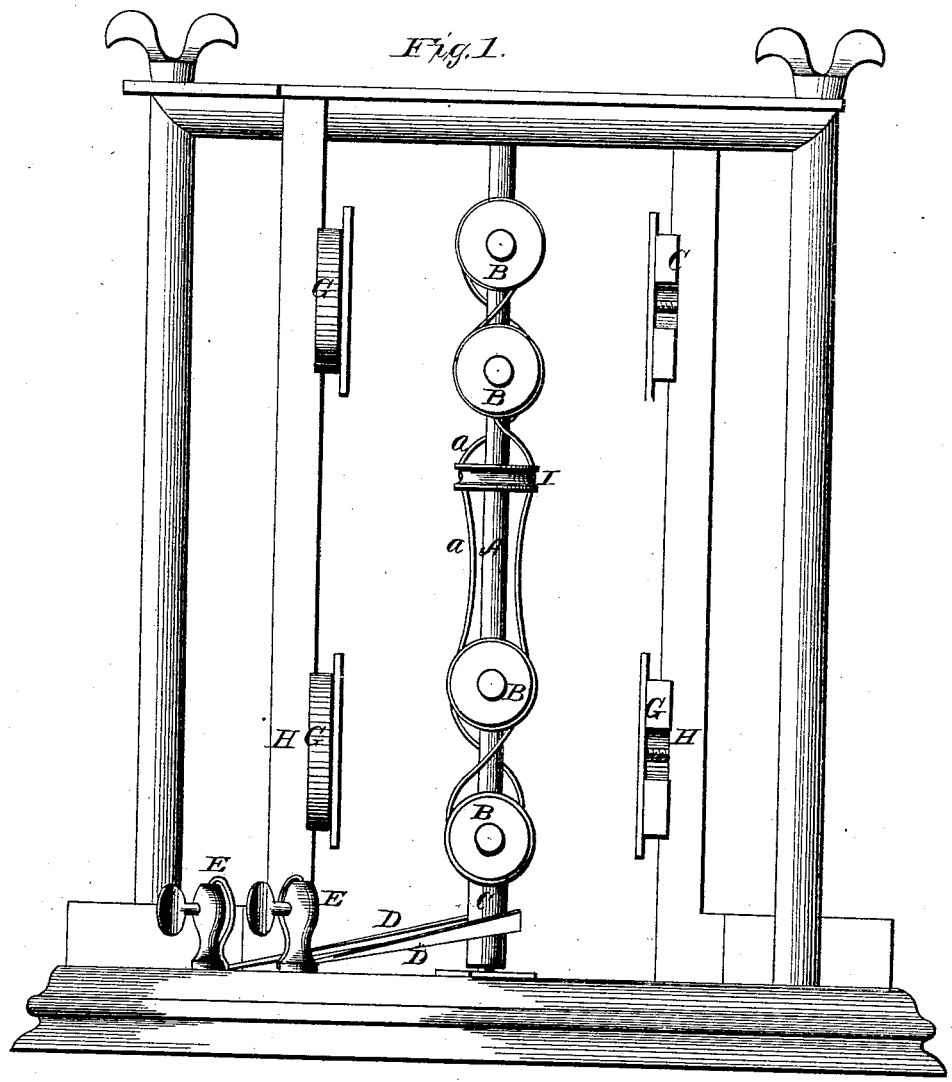

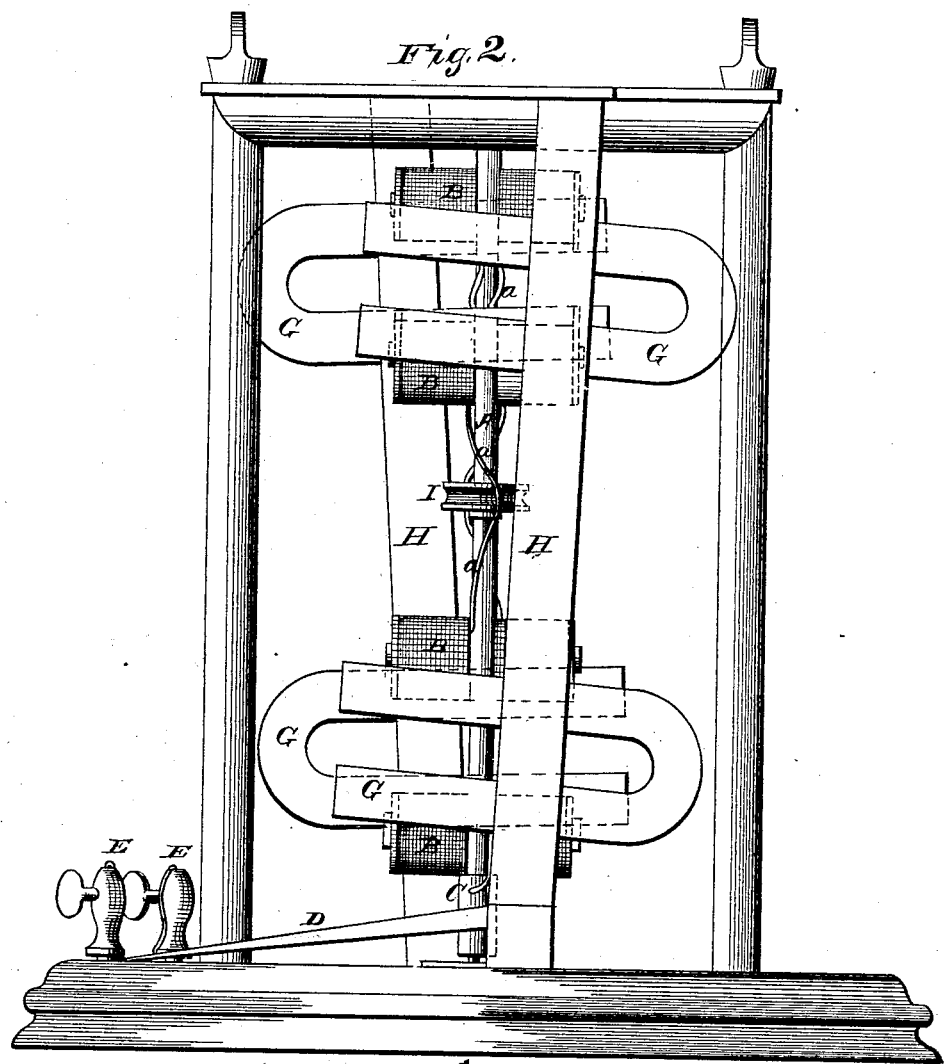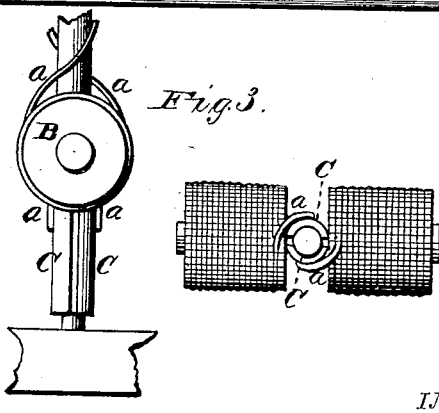

DAVID WARD, OF BINGHAMTON, NEW YORK.

IMPROVEMENT IN ELECTRIC MOTORS.

Specification forming part of Letters Patent No. 186,642, dated January 23, 1877; application filed July 13, 1876.

*To all whom it may concern:*

Be it known that I, DAVID WARD, of Binghamton, in the county of Broome and in the State of New York, have invented certain new and useful Improvements in Electric Motors; and do hereby declare that the following is a full, clear, and exact description thereof, reference being had to the accompanying drawings, and to the letters of reference marked thereon, making a part of this specification.

The nature of my invention consists in the construction and arrangement of an electric motor, as will be hereinafter more fully set forth.

In order to enable others skilled in the art to which my invention appertains to make and use the same, I will now proceed to describe its construction and operation, referring to the annexed drawings, in which—

Figure 1 is a front elevation of my motor. Fig. 2 is a side elevation of the same; and Fig. 3 shows a detached part thereof.

A represents a vertical shaft, rotating in suitable non-conducting bearings. On this shaft I have arranged four pairs of electro-magnets, B B, extending horizontally in opposite directions from the shaft. The wires *a a* surrounding these magnets are connected at the top, and at the bottom they connect with the two parts of a vertically-bisected sleeve or cylinder, C, placed around the lower end of the shaft. E E are the two binding-posts for attaching the wires from the battery, and from these posts extend springs D D to bear against opposite sides of the sleeve C. G G represent four steel magnets, of horseshoe form, fastened to suitable supports H H, and arranged so as to be opposite the ends of the electro-magnets B B. Connection being made with the battery the current passes through one of the springs D, through one part of the bisected cylinder or sleeve C, and through the wire *a* around all the electro-magnets on one side of the shaft; then down around the magnets on the opposite side, and through the other part of the sleeve, and the other spring back to the battery.

Now, as the current from the positive pole of the battery electrifies or charges one magnet, B, and this magnet is opposite the negative pole of one of the steel magnets, the result is that the electro-magnet will be attracted toward the steel magnet, and rotate the shaft a certain distance sufficient to change the polarity of the electro-magnet by the bisected sleeve or cylinder C changing the contact of its two parts with the springs D D, and hence the electro-magnet spoken of will change to negative, and be repelled from the steel magnet continuing the revolution of the shaft; and this same electro-magnet is further attracted by the positive pole of the steel magnet, on the opposite side until the polarity is again changed, when it is again repelled, producing a continuous rotary motion. All the magnets act in precisely the same manner, and hence any number or sets of magnets may be used according to the power desired. On the shaft A is secured a pulley, I, which is to be connected by a belt with the machinery to be driven.

If more power is desired, four sets of steel magnets and four sets of electro-magnets may be used, in which case the sleeve or cylinder C should be divided in four parts, and the wires attached to them, so as to change the polarity of the magnets four times during each revolution of the shaft.

By the construction of this motor I utilize the steel magnets in connection with the electro-magnets, so that only a weak battery is required to produce a rapid revolution of the shaft; and, further, the steel magnets instead of being weakened are being constantly charged and maintained up to their full capacity.

Instead of single steel magnets I may use compound magnets for the purpose of increasing the power.

I do not wish to be confined to the particular mechanism described for changing the polarity of the electro-magnets, or to any particular number or style of magnets.

Having thus fully described my invention, what I claim as new, and desire to secure by Letters Patent, is—

The combination of the shaft A, provided with two or more series of electro-magnets, B, the wires *a a*, divided sleeve or cylinder C, and springs D D, connecting with the binding-posts E E, substantially as and for the purposes herein set forth.

In testimony that I claim the foregoing I have hereunto set my hand this 13th day of July, 1876.

his
Witnesses:    DAVID + WARD.
           mark.
 C. L. EVERT.
 M. L. STOWELL.